May 9, 1939.　　C. W. METZGAR　　2,157,829
SEPARATOR
Filed May 14, 1937

INVENTOR
Chester W. Metzgar
BY
HIS ATTORNEY.

Patented May 9, 1939

2,157,829

UNITED STATES PATENT OFFICE 2,157,829

SEPARATOR

Chester W. Metzgar, Easton, Pa., assignor to Ingersoll-Rand Company, Jersey City, N. J., a corporation of New Jersey Application May 14, 1937, Serial No. 142,717

4 Claims. (Cl. 183—110)

This invention relates to separators, and more particularly to a separator adapted to be interposed in a pressure fluid transmission line.

One object of the invention is to effect the removal of foreign substances from the pressure fluid.

Other objects will be in part obvious and in part pointed out hereinafter.

Figure 1:
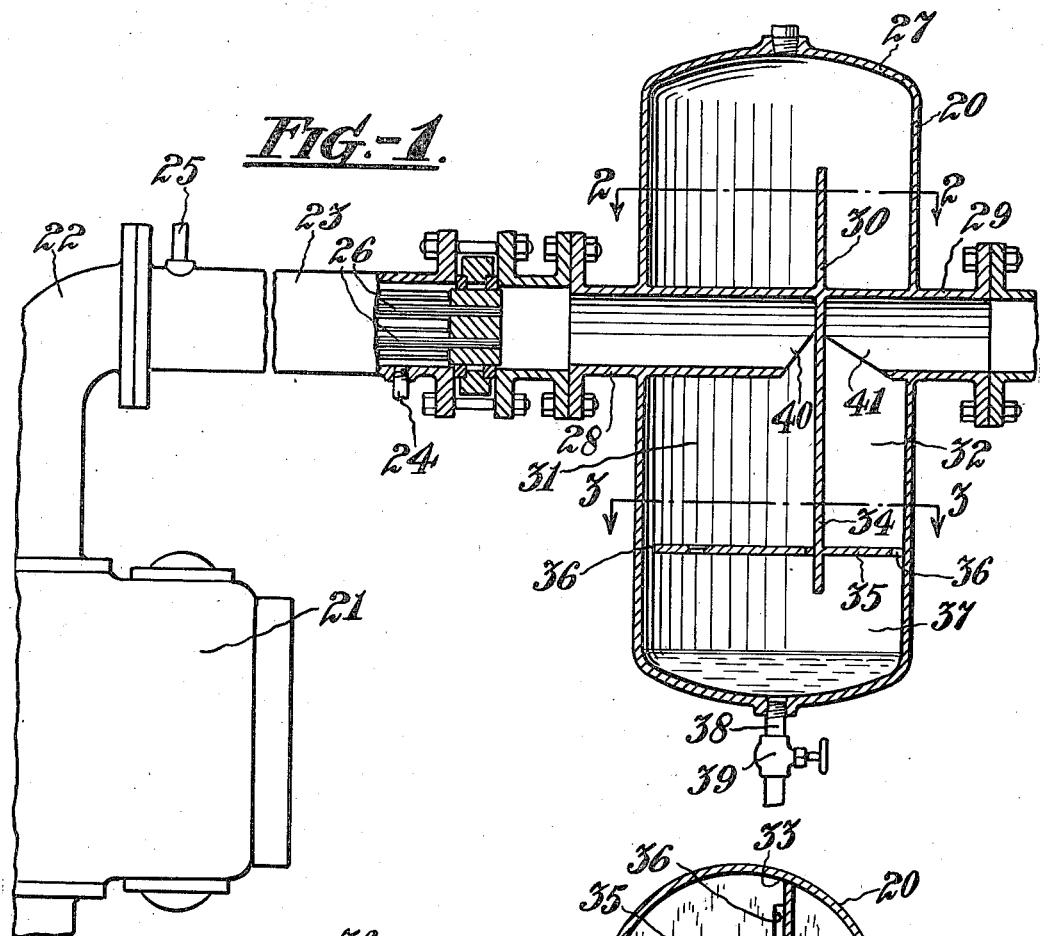
Figure 2:
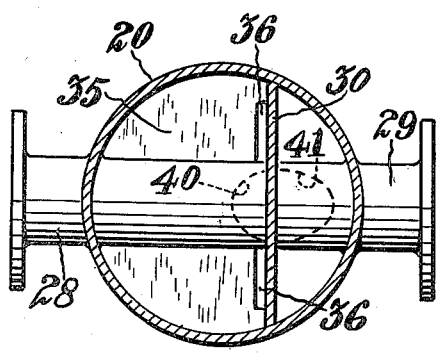
Figure 3:
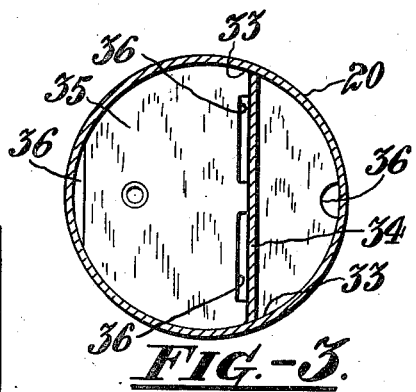

In the drawing accompanying this specification and in which similar reference numerals refer to similar parts, Figure 1 is an elevation, in section, of a separator constructed in accordance with the practice of the invention and showing it applied to the discharge line of a compressor, and Figures 2 and 3 are transverse views taken on the lines 2—2 and 3—3 of Figure 1.

Referring more particularly to the drawing, 20 designates a separator constructed in accordance with the practice of the invention, 21 a compressor and 22 a discharge line having the separator 20 interposed therein.

The discharge line 22 is equipped with an aftercooler 23 having inlet and outlet connections 24 and 25, respectively, for cooling water. The cooling water circulates through the casing of the aftercooler and around tubes 26 to cool the compressed fluid flowing through the tubes and effect condensation of the entrained moisture.

The separator 20 is preferably arranged closely adjacent the aftercooler. It comprises a casing 27 and inlet and outlet conduits 28 and 29, respectively, which are suitably connected to the adjacent portions of the discharge line. The conduits 28 and 29 may, as shown, be bonded to the casing 27. They are arranged coaxially with respect to each other and are molecularly united at their inner ends with a baffle 30 extending longitudinally of the casing 27.

The portion of the conduit 28 extending into the casing 27 is preferably of greater length than the corresponding portion of the conduit 29. The baffle 30 will, therefore, lie relatively close to the down stream side of the casing 27 and the space 31 in the casing between the baffle 30 and the point of union of the conduit 28 with the casing will be of greater volume than the space 32 on the opposite side of the baffle 30.

The baffle extends to a point intermediate the conduits and the top of the casing 27 and its side edges 33 seat against the inner surface of the casing and may be bonded thereto. The portion 34 of the baffle lying below the conduits is supported by a plate 35 extending transversely of the casing 27 and having a series of openings 36 which are located at points best suited to provide ready outlets for the condensate that is cast out of the air stream flowing through the casing.

The portion of the casing lying below the plate 35 constitutes a well 37 for condensate which may be periodically drained through a conduit 38 controlled by a valve 39.

As a preferred construction, the apertures that afford communication between the interiors of the conduits 28 and 29 and the casing 27 and which are designated 40 and 41, respectively, are located immediately adjacent the baffle 30. The openings 40 and 41 are arranged angularly with respect to the baffle 30. The opening 40 is of smaller cross sectional area than the interior of the conduit 28 so that the velocity of the fluid issuing from the opening 40 will be highly accelerated in order to assure the precipitation of the major portion of entrained moisture at the initial deflection point of the pressure fluid.

In the operation of the device the fluid discharged by the compressor passes through the discharge line 22 and the aftercooler 23 where it is cooled and the entrained moisture is condensed. The pressure fluid and the condensate then pass into the conduit 28 and, upon issuing from the opening 40, the velocity of the pressure fluid, by reason of the restricted area of the opening 40, is greatly accelerated and the moisture globules are hurled against the baffle 30 and will run down along the baffle and through the adjacent drain apertures 36 into the well 37.

The pressure fluid will then pursue a downwardly course against the plate 35 whereby it will be deflected upwardly. It will then flow through the chamber 31 into the upper portion of the casing 27, thence curve over the upper edge of the baffle and flow downwardly through the chamber 32 where it is again deflected upwardly by the plate 35 and will pass through the opening 41 into the conduit 29 and thus to the place of consumption or storage.

From the foregoing description it will be readily apparent to those skilled in the art that, upon its issuance from the conduit 28, the pressure fluid will be expanded in the chamber 31 and, owing to the consequent temperature reduction and to the whirling motion of the fluid through the casing the entrained moisture will be hurled centrifugally from the stream at the deflection points so that pressure fluid will again enter the discharge line substantially free of any substances that might have a deleterious effect upon the transmission line or the devices which it actuates.

I claim:

1. A separator for moisture and the like carried by a fluid, comprising a casing, a fluid inlet conduit extending into the casing having a restricted outlet opening to increase the velocity of a fluid entering the casing, a fluid outlet conduit extending into the casing having an inlet opening contiguous to the restricted outlet opening, and a baffle interposed between the conduits forming a bounding surface for each opening and extending into the casing to deflect fluid from the outlet opening through the casing and into the inlet opening.

2. A separator for moisture and the like carried by a fluid, comprising a casing, a fluid inlet conduit extending into the casing and having a restricted outlet opening to increase the velocity of the fluid entering the casing, a fluid outlet conduit arranged coaxially with respect to the inlet conduit extending into the casing and having an inlet opening contiguous to the restricted outlet opening, and a baffle in the casing traversing the adjacent ends of the conduits and encircling the conduits to deflect fluid from the restricted outlet opening through the casing and into the inlet opening.

3. A separator for moisture and the like carried by a fluid, comprising a casing, a fluid inlet conduit extending into the casing and having a restricted outlet opening to increase the velocity of the fluid entering the casing, a fluid outlet conduit extending into the casing and having an inlet opening contiguous to the restricted opening, a plate arranged transversely in the lower portion of the casing and confronting the openings, and a baffle on the plate interposed between the conduits and extending above the conduits to deflect fluid from the outlet opening through the casing and into the restricted inlet opening.

4. A separator for moisture and the like carried by a fluid, comprising a casing, a fluid inlet conduit extending into the casing and having a restricted outlet opening to increase the velocity of a fluid entering the casing and direct it downwardly into the casing, a fluid outlet conduit extending into the casing arranged coaxially with the inlet conduit and having an inlet opening contiguous to the restricted outlet opening, a transverse plate having a series of drain openings therethrough in the lower portion of the casing to act as an impinging baffle for the fluid entering the casing through the restricted outlet opening and to direct fluid in the casing to the inlet opening, said transverse plate and casing defining a condensate well adapted to collect condensate removed from the fluid and draining through said drain openings, and a baffle on the plate interposed between the conduits and extending above the conduits whereby fluid entering through the restricted outlet opening must pass over the top of said baffle to reach the inlet opening.

CHESTER W. METZGAR.